United States Patent [19]

Penn

[11] Patent Number: 4,899,826
[45] Date of Patent: Feb. 13, 1990

[54] COMBINATION FIRE EXTINGUISHER AND TIRE SEALER

[76] Inventor: William T. Penn, 20610 East Fuero Dr., Walnut, Calif. 91789

[21] Appl. No.: 173,424

[22] Filed: Mar. 25, 1988

[51] Int. Cl.⁴ .............................................. A62C 11/00
[52] U.S. Cl. ...................................... 169/30; 141/38; 169/54; 169/62; 169/74
[58] Field of Search .................. 169/43, 54, 62, 70, 169/9, 30, 71, 74, 76, 91; 141/38; 252/3; 222/402.14; 239/289, 390, 391, 1

[56] References Cited

U.S. PATENT DOCUMENTS

| | | | |
|---|---|---|---|
| 2,069,667 | 2/1937 | Clawson | 239/391 |
| 2,732,017 | 1/1956 | Fleming | 169/70 |
| 2,759,647 | 8/1956 | Boyer | 141/38 |
| 2,812,783 | 11/1957 | Bufogle | 141/38 |
| 2,991,629 | 7/1961 | Rose | 141/38 X |
| 3,183,945 | 5/1965 | Edwards, Jr. | 141/38 |
| 3,395,838 | 8/1968 | Beres et al. | 222/402.14 |
| 3,609,074 | 9/1971 | Rainaldi et al. | 252/3 |
| 3,708,194 | 1/1973 | Amit | 769/62 X |
| 3,843,586 | 10/1974 | Wolf | 252/350 X |
| 4,014,799 | 3/1977 | Owens | 252/3 X |

Primary Examiner—Joseph F. Peters, Jr.
Assistant Examiner—Paul E. Salmon
Attorney, Agent, or Firm—Paul R. Wylie

[57] ABSTRACT

A fire extinguisher for automotive use is provided with the additional capability of sealing and reinflating a flat tire without any wheel removal. The device is charged with a combination fire-extinguishing and tire-sealing composition, and fitted with a removable nozzle for extinguishing fires. To seal and inflate a flat tire, the nozzle is removed, and, in its place, one end of an adaptor hose assembly is attached to the fire extinguisher, and the other end is connected to the tire valve with the wheel rotated to place the puncture or leak at the bottom. Then actuating the device dispenses sealant into the tire while inflating it, after which vehicle movement distributes the sealant and generates heat which accelerates the tire-sealing action and further inflates the tire to a higher pressure, enabling the vehicle to proceed to a service station.

6 Claims, 2 Drawing Sheets

COMBINATION FIRE EXTINGUISHER AND TIRE SEALER

FIELD OF THE INVENTION

This invention relates to the field of automotive accessories. Within this field it relates to fire extinguishers having the additional capability of sealing and reinflating pneumatic tires.

BACKGROUND OF THE INVENTION

DESCRIPTION OF PRIOR ART

Portable fire extinguishers intended to be carried in a motor vehicle for extinguishing the types of fires usually associated with motor vehicles are well known. A common type uses stored pressure to expel a mixture of chemical fire extinguishing agents when actuated.

Other on-board motoring accessories include emergency tire repair kits and portable apparatus, including hand pumps, electrically powered pumps and devices which derive pressure from the vehicle's engine, for reinflating a repaired tire. In the prior art these items have been available only as separate items, and thus have tended to cause inconvenience and occupy premium space in the vehicle.

In a flat tire emergency, it is often impractical or overly strenuous for some drivers to jack up the vehicle to change to a spare tire. The present invention provides a specially-charged fire extinguisher with the alternate capability of sealing and reinflating a flat tire without wheel removal: a quick and easy repair measure to enable the vehicle to proceed to a service station.

DESCRIPTION OF THE INVENTION

The present invention has as its primary object the combining in a single portable device the capabilities of extinguishing fires, sealing tire leaks and reinflating flat tires.

These capabilities have been achieved in the present invention by charging a single container with a combination of fire-extinguishing and tire-sealing agent selected to have the capabilities of (a) providing sufficient pressure and volume of harmless gaseous composition to inflate a flat tire while injecting sealant into the tire and (b) alternately functioning as a conventional automotive fire extinguisher.

BRIEF DESCRIPTION OF THE DRAWINGS

FIG. 3 shows the device of FIG. 1 being used to seal and inflate a tire.

DETAILED DESCRIPTION OF THE INVENTION

Figure 1:
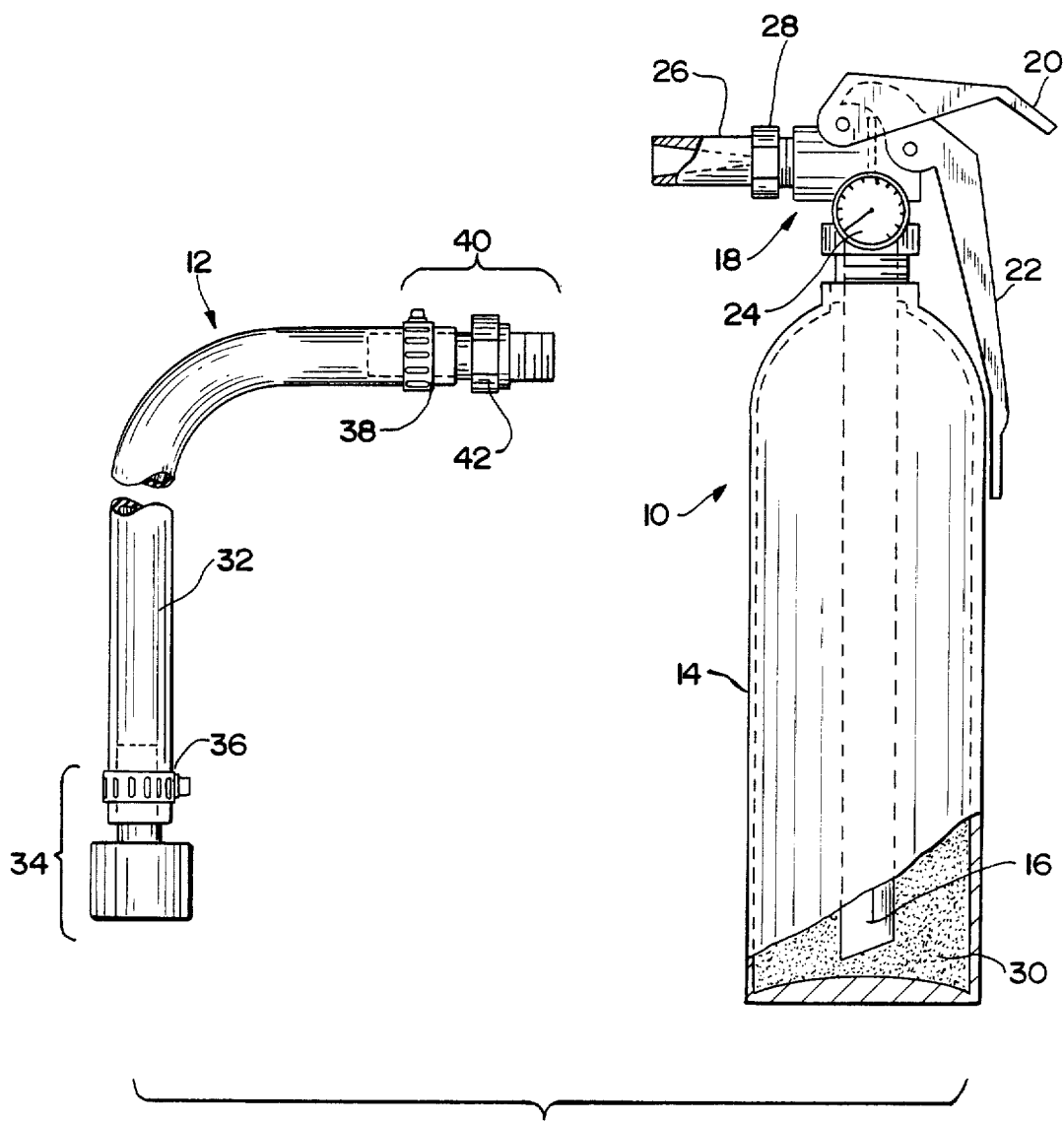
FIG. 1 is a side view of a combination fire extinguisher and tire sealer in an illustrative embodiment of the present invention.

Referring to FIG. 1, the device shown illustrates the present invention in a preferred embodiment comprising a fire extinguisher 10, and a conduit assembly 12. Fire extinguisher 10 is a hand extinguisher of the stored-pressure dry type, having an aluminum alloy pressure tank 14 fitted with an internal siphon tube 16 and a head assembly 18 comprising a discharge lever 20 which actuates an internal discharge valve, a carrying handle 22, a pressure gage 24, and a nozzle 26 having an externally threaded portion which threads into the head assembly 18 where it is held in a fixed position. Integral with nozzle 26 is a hex nut 28 for tightening and loosening the nozzle.

The tank 14 is charged with a special chemical composition 30 taught by this invention, combining a fire extinguishing agent and a tire sealing agent, and pressurized by an expellant gas.

Conduit assembly 12 comprises a length of hose 32 having at one end an internally-threaded tire valve coupler 34, fastened by clamp 36, and at the other end, fastened by clamp 38, an externally-threaded coupler 40, which may be threaded into head assembly 18 in place of nozzle 26, and having an integral hex nut 42 similar to nozzle hex nut 28.

In normal deployment in a vehicle, the fire extinguisher 10 is kept ready for fire duty with nozzle 26 in place as shown. Extinguisher 10 may be fastened to a bulkhead bracket by a buckled clamp (not shown) which holds carrying handle 22 against the tank 14 as shown; in this position, handle 22 locks discharge lever 20 against accidental discharge. Conduit assembly 12 is stored separately nearby.

Figure 2:
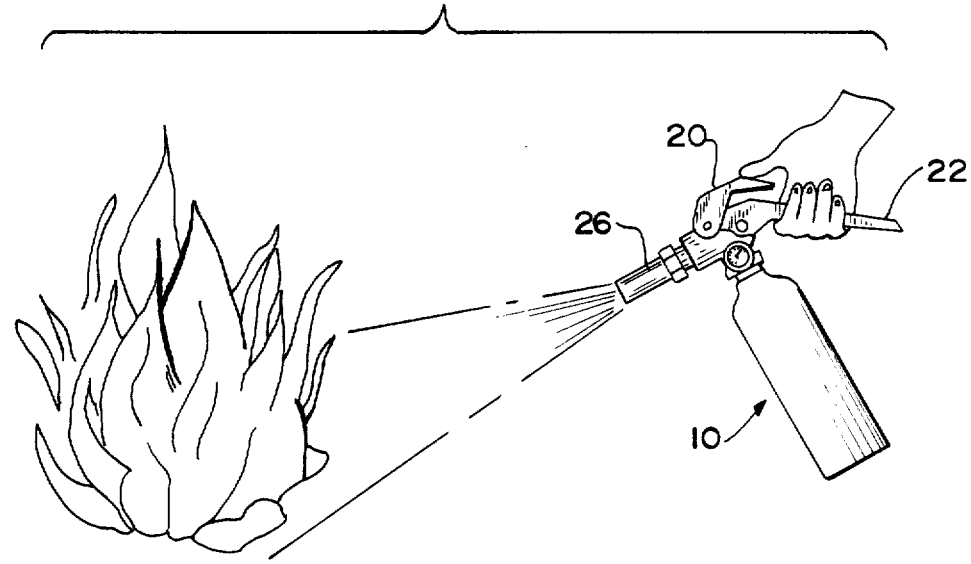
FIG. 2 shows the device of FIG. 1 being used to extinguish a fire.
Figure 2:
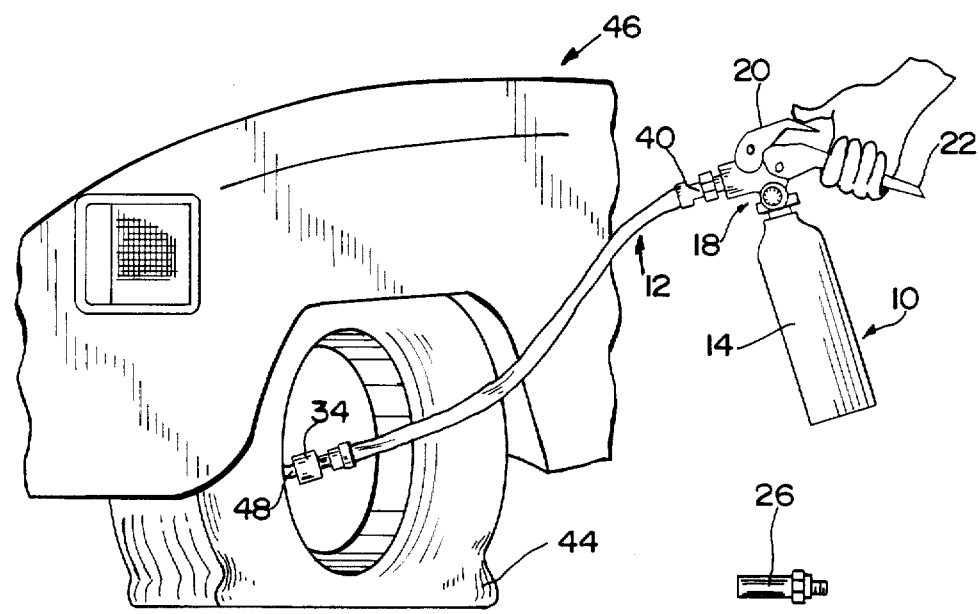

FIG. 2 shows extinguisher 10 in use to extinguish a fire. Pulling carrying handle 22 away from tank 14 enables single-handed operation in a generally upright position as shown, and unlocks discharge lever 20 which may be thumb-depressed to expel the contained composition including the fire extinguishing agent, whereby the fire extinguisher 10 performs in a normal manner to extinguish a fire.

FIG. 3 shows how the device of FIG. 1 is used to repair a punctured flat tire 44 on a vehicle 46. The user threads nozzle 28 off from the head assembly 18 then threads coupling 40 on in place of nozzle 26. The vehicle 46 is moved so to place the puncture at the bottom of the tire 44, then valve coupler 34 is threaded onto the valve 48 of tire 44. Then, as in fire duty, carrying handle 22 is moved away from tank 14, unlocking discharge level 20. With the extinguisher 10 held by handle 22 in one hand, discharge lever 20 may be thumb-depressed to dispense the contained composition from tank 14 through the conduit assembly 12 and tire valve 48 to simultaneously inflate the tire 44 and inject sealant material into it. User's instructions specify the discharge time which is typically well under one minute.

The user is advised, after uncoupling the tire valve coupler 34, to move the vehicle 46 immediately for one to two minutes. This spreads the sealant material around inside the tire 44 and generates heat to simultaneously accelerate the sealing action and further increase the tire pressure. The user may then proceed to drive the vehicle 46 to a service station for normal tire repair.

Tank 14 is charged with a mixture comprising three basic components:

(1) a pressurized expellant gas, (2) a fire extinguishing agent suitable for Class B fires, and (3) a latex or equivalent tire sealant, which may include a high molecular weight fiber component.

Each of these three components must have a composition which does not support combustion or react harmfully with each other or with the interior walls of a tire, the metal rim or the rim seal.

The preferred embodiment as described heretofore comprises a standard stored-pressure type of fire extinguisher which is recognized by the National Fire Protection Association and rated for Class B hazards defined as fires in flammable liquids, oils, greases, tars, oil base paints, lacquers, and flammable gases.

The fire extinguisher is preferably charged with bromochlorodifluoromethane (Halon 1211) as the fire extinguishing agent. This agent is a low boiling point liquid and is further pressurized to service pressure by an expellant gas. Tank 10 may be made from stainless steel, mild steel, or aluminum alloy and it must be permanently labelled to show the service pressure, and must be initially factory tested at twice the service pressure. This type of extinguisher is subject to periodic inspection, testing and recharging, especially after use or after a specified time period of standby service.

In accordance with a preferred embodiment of the invention, the latex tire sealant comprises a solution or suspension of latex material and water in proportionate amounts to produce a mixture of a consistency to adhere to the inside of a tire. To this mixture is added an amount of laury trimethy ammonium chloride in an amount of about 15 to 30% of the latex mixture.

An expellant, such as Forane 12 together with fire extinguishing constituents such as Halon 1301 and/or 1211BCF in a total amount of about 60 to 75% of the latex and laury trimethyl ammonium chloride mixture are added to the mixture.

An alternative embodiment, intended for onetime use only, may be implemented using a sheet metal canister of the type commonly used for aerosol sprays. The canister is originally charged with the special combination composition of this invention. Instead of the usual rightangle plastic nozzle, it is preferable to provide a straight through nozzle of plastic or metal, adapted to be removably pushed onto the normal hollow valve plunger stem. The straight nozzle is preferably fitted with a circular flange allowing two-finger depression for actuation. For tire sealing and inflation, the nozzle can be removed from the stem and replaced with a conduit assembly functionally similar to the conduit assembly 12 of FIG. 1, that is adapted to fit onto the stem in place of the nozzle. In normal deployment the device would be kept ready for fire duty with the nozzle in place, protected against accidental discharge by a well-known type snap-on cap, while the conduit assembly would be stored separately nearby.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of enabling a fire extinguisher to serve in alternative functions of sealing and reinflating a leaking pneumatic tire, comprising the steps of:
   (1) providing a fire extinguisher having a detachable nozzle;
   (2) charging said fire extinguisher with a combination of fire-extinguishing and tire-sealing agents;
   (3) assembling a conduit assembly comprising a length of conduit fitted at one end with a coupling adapted to engage said fire extinguisher in place of said nozzle, and fitted at the other end with a valve coupler for threadedly engaging a pneumatic tire valve;
   (4) supplying to a user, for deployment aboard a vehicle, (a) said fire extinguisher, thusly charged, (b) said conduit assembly, and (c) a set of operating instructions.

2. A method of sealing and inflating a vehicle's pneumatic tire from a fire extinguisher charged with a special combination fire-extinguishing and tire-sealing composition, comprising the steps of:
   (1) detaching a removable nozzle from said fire extinguisher;
   (2) attaching to said fire extinguisher, in place of the detached nozzle, a coupling fitted to one end of a hose of a conduit assembly;
   (3) moving the vehicle so as to locate suspected leakage at the bottom of said tire;
   (4) attaching a tire valve coupling, fitted to the other end of the hose of the conduit assembly, to a valve of a pneumatic tire to be sealed and inflated;
   (5) actuating the fire extinguisher to dispense the special combination fire-extinguisher and tire-sealing composition through the conduit assembly and tire valve into the tire;
   (6) detaching the conduit assembly from the tire valve; and
   (7) moving the vehicle so as to disperse the composition within the tire and to generate heat therein, thereby accelerating the sealing action of said special combination fire-extinguisher and fire-sealing composition and further increasing pressure in the tire, and thus enabling the vehicle to be driven to a service station.

3. A combination fire extinguisher and tire sealer comprising:
   (a) fire extinguisher container;
   (b) a combinat on fire-extinguishing and tire-sealing composition within said fire extinguisher container, sail composition being capable of extinguishing a fire and sealing a pneumatic tire when injected into the interior of said tire;
   (c) a nozzle means to dispense said composition from said fire extinguisher container in a manner to extinguish fires; and
   (d) a tire sealer conduit means adapted to connect said fire extinguisher container and a valve of said pneumatic tire at opposite ends thereof, enabling said composition to be dispensed from said container and injected into the interior of said pneumatic tire in a manner to seal the tire against loss of pressure;
   said fire extinguishing container including a discharge valve adapted to remain normally closed so as to contain said composition within said container, and associated with said discharge valve, valve actuating means adapted to open said valve in response to manual pressure applied to said actuating means by a user, and thus cause said composition to be expelled from said container through said nozzle means, said valve actuating means comprising a hinged discharge lever adapted to open said discharge valve when said discharge lever is manually depressed toward said container to a discharge position, and further comprising a hinged carrying handle adapted to have a storage position in which it is positioned so as to lock said discharge lever against moving to its discharge position, and a carrying position in which it is positioned so as to allow said discharge lever to be depressed to its discharge position; and said combination fire-extinguishing and tire-sealing composition comprising an expellant having the capability of expelling said composition from said container in the form of a pressurized gaseous mixture, enabling injection of the sealant of said composition into said pneumatic tire through said conduit means so as to simultaneously seal and inflate the tire.

4. The invention as in claim 3 wherein said tire sealer conduit means comprises:

a length of flexible conduit of a type capable of conducting gaseous flow under pressure; at one end of said conduit, externally threaded coupling means adapted to be removably coupled to said fire extinguisher container in place of said nozzle; and at the other end of said conduit, an internally threaded fire valve coupling adapted to be coupled to said tire valve.

5. A combination fire extinguisher and tire sealer comprising:

(a) a fire extinguisher container;

(b) a combination fire-extinguishing and tire-sealing composition within said fire extinguisher container, said composition being capable of extinguishing a fire and sealing a pneumatic tire when injected into the interior of said tire;

(c) a nozzle means to dispense said composition from said fire extinguisher container in a manner to extinguish fires; and (d) a tire sealer conduit means adapted to connect said fire extinguisher container and a valve of said pneumatic tire at opposite ends thereof, enabling said composition to be dispensed from said container and injected into the interior of said pneumatic tire in a manner to seal the tire against loss of pressure; said fire extinguishing container including a discharge valve adapted to remain normally closed so as to contain said composition within said container, and associated with said discharge valve, valve actuating means adapted to open said valve in response to manual pressure applied to said actuating means by a user, and thus cause said composition to be expelled from said container through said nozzle means; and wherein said container is made cylindrical in shape; said discharge valve comprises a hollow plunger stem, extending outward from an end of said container, adapted to open said discharge valve when said plunger stem is depressed toward said container; wherein said nozzle means comprises a coaxial nozzle having a central passageway adapted to fit over said plunger stem; and wherein said valve actuating means comprises a peripheral flange portion configured concentrically as part of said nozzle, whereby pressure applied by fingers of a user onto said flange portion, depressing said plunger stem, causes said valve to open and thus expel said composition from said container through said stem and said nozzle in a manner to extinguish fires; and said combination fire-extinguishing and tire-sealing composition comprising an expellant having the capability of expelling said composition from said container in the form of a pressurized gaseous mixture, enabling injection of the sealant of said composition into said pneumatic tire through said conduit means so as to simultaneously seal and inflate the tire.

6. The invention as in claim 5 wherein said tire sealer conduit means comprises:

a length of flexible conduit of a type capable of conducting gaseous flow under pressure;

at one end of said conduit, a plunger stem coupling adapted to be removably attached to said plunger stem; and at the other end of said conduit, an internally threaded tire valve coupling adapted to couple said tire valve.

* * * * *